July 12, 1966
V. J. KELLEY
3,260,537
PROTECTIVE CAP FOR PINS
Filed Aug. 31, 1964
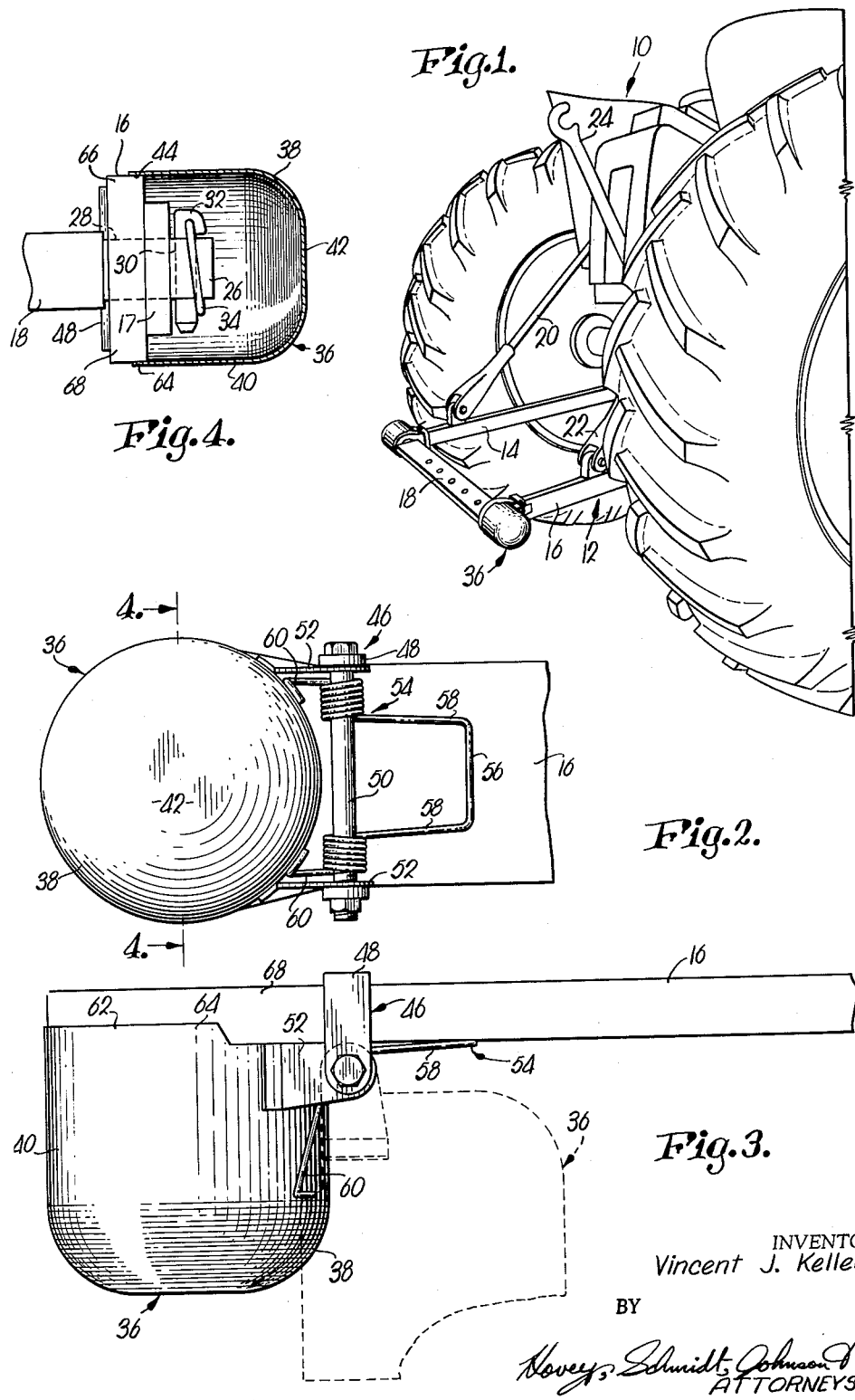
INVENTOR.
Vincent J. Kelley
BY
Hovey, Schmidt, Johnson & Hovey.
ATTORNEYS.

though it will be appreciated that the invention hereinafter described would make it unnecessary to provide a locking ring such as 34.

United States Patent Office 3,260,537
Patented July 12, 1966

3,260,537
PROTECTIVE CAP FOR PINS
Vincent J. Kelley, R.R. 1, Chapman, Kans.
Filed Aug. 31, 1964, Ser. No. 393,258
4 Claims. (Cl. 280—507)

This invention relates to a protective device for pins carried by shafts or the like and, more particularly, to a protective cap which covers said pins in such a manner that the same cannot be accidentally or inadvertently dislodged from their desired positions.

It is the primary object of this invention to provide a protective cap for retaining pins and locking rings associated therewith, which pins are used in connection with the power-lift assembly of a tractor, which assembly has a drawbar, which is free to oscillate or swivel, interconnecting a pair of spaced arms, the pin and its associated ring serving to retain the drawbar with respect to its arms and thereby serve in the linkage which coupled the tractor to an implement or other trailed piece of machinery.

In this regard, the conventional power lift assembly for tractors is provided with a pair of rearwardly extending lifting arms, which lifting arms are normally interconnected by a drawbar to which a trailed implement is attached or hitched. A third arm is provided as a part of the tractor assembly, which arm engages the implement in a suitable manner whereby the implement may be lifted when and if such is desired. This combination presents what is commonly referred to as a "3-point hookup."

During their operation and while trailing implements or the like from the above described 3-point hookup, tractors must often travel over terrain having brush, weeds or the like, of such height that the same become entangled in the components of the 3-point hookup tending to dislodge said components from their desired position if they are not effectively retained against such dislodging forces. Particularly, pins which are inserted through the ends of shafts to retain the shafts in their desired positions may be easily dislodged by brush or other foreign matter coming into contact with the pin and dislodging its locking ring. Even if such pins are provided with locking rings, as is done in certain instances, the foreign matter, such as brush, weeds or the like, will often engage the locking ring whereby to shift the same from its locked position to an unlocked position, thereby eliminating the effectiveness thereof and allowing the pin to be dislodged from its position of retention.

It is, therefore, the primary object of this invention to provide a protective cap to prevent dislodgment of pins and rings of the type hereinabove described, which cap is securely positioned in protecting relationship to the pin and ring. The protective cap is carried by a component of the 3-point hookup whereby to position a hollow cap over the end of the shaft which carries the retaining pin in such a manner that the cap may at all times enclose the pin whereby to prevent access thereto by any foreign matter and ultimate dislodging of the pin.

A yet further aim of this invention is to provide a protective cap for pins which includes a hollow cap portion having an open end adapted to receive an end of a shaft within which the retaining pin is carried, there being suitable mechanism for mounting the cap on an adjacent component of the tractor hitch assembly, whereby the hollow cap may be shifted from its position enclosing the retaining pin when access to the pin is desired or necessary.

A yet further aim of the invention is to provide, in a protective cap for pins, resilient means for mounting the cap whereby the same will be constantly urged into its position enclosing the retaining pin whereby to prevent inadvertent access to said pin.

Other objects will become apparent from the following specification and accompanying drawing, wherein:

FIGURE 1 is a fragmentary, perspective view showing the tractor power lift assembly with a pair of protective caps mounted thereupon;

FIG. 2 is an enlarged, fragmentary, side view of the protective cap showing the manner in which the same is mounted on the arm;

FIG. 3 is a plan view of the structure shown in FIG. 2; and

FIG. 4 is a reduced, fragmentary, partially cross-sectional view taken on line 4—4 of FIG. 2.

A conventional farm tractor, designated 10, either conventionally carries or can be adapted to carry a power lift assembly 12, which lift assembly 12 includes a pair of rearwardly extending arms 14 and 16 having outermost ends which are interconnected by a drawbar 18 which spans the distance between said arms 14 and 16. Said arms 14 and 16 are suitably coupled to the power assembly of the tractor by members 20 and 22 whereby a lifting force may be exerted thereupon. A third arm 24 is also provided, which arm is suitably connected to the trailed implement or vehicle in a manner not important to the present invention.

The drawbar 18 is the same at each end thereof and each of said ends thereof is mounted in its corresponding arm 14 or 16 in the identical fashion. Thus, only one of the connections between the drawbar 18 and the arm 16 will be described hereinafter.

Drawbar 18 has a reduced, cylindrical portion 26 which extends through an aperture 28 provided in arm 16, said aperture defining a bearing surface for the cylindrical portion 26 of drawbar 18, said end of the arm 16 also being in the form of a ball joint or self-aligning bearing 17 whereby the drawbar 18 may rotate with respect to arms 14 and 16 and may also rock with respect thereto.

The outermost end of reduced portion 26 of drawbar 18 is provided with a hole 30 which extends therethrough and which is intended to receive a retaining pin 32 extending through said hole 30 in the manner shown in FIG. 4 of the drawing. As shown in said figure, retaining pin 32 may be provided with a locking ring such as 34 which is spring-biased in such a manner as to cause the same to assume the position shown in FIG. 4 when the retaining pin 32 is in position, although it will be appreciated that the invention hereinafter described would make it unnecessary to provide a locking ring such as 34.

The protective cap assembly, broadly designated by the numeral 36, includes a cup-shaped, hollow cap 38, having a continuous, cylindrical side wall 40, a bottom wall 42, and an open end 44. Cap 38 is attached to its arm such as 16 by mounting mechanism broadly designated as 46, which includes a bracket 48 which embraces arm 16 and carries adjacent the surface of arm 16 proximal to pin 32, a hinge pin 50. It will be appreciated that, rather than utilizing a bracket such as 48, a pair of ears might be welded directly to or cast as a part of the arm 16, which ears would carry hinge pin 50. Hinge pin 50 is interconnected to cap 38 by strap means 52 which are secured at one end thereof to the side wall 40 of the cap and at the other end thereof in rotatable fashion to the hinge pin 50.

Resilient means 54 are operably associated with the cap 38 and the mechanism 46 whereby to urge cap 38 to its normally closed position enclosing the reduced end portion 26 of drawbar 18 and also pin 32 and locking ring 34. Said resilient means includes a spring having a bight 56 which is in engagement with arm 16 and, more particularly, the surface thereof proximal to pin 32, the bight having a pair of legs 58 extending therefrom toward said hinge pin 50, the legs each being coiled about the hinge pin and extending therebeyond whereby to present a pair of fingers 60, which fingers 60 are each in engagement with the exterior surface of the side wall 40 of the cap 38 whereby to exert the pressure developed by the spring on the cap 38.

The outermost end of arm 16 is configured in such a manner that it complementally receives the open end 44 of cap 38. In this regard, the edge 62 of cap 38 which defines the open end 44, is provided with an arcuate flange 64 which partially surrounds one end of the arm 16 when the cap is in its closed position in engagement with the arm 16. As best shown in FIGS. 3 and 4, said arcuate flange 64 is in engagement with the face 66 of the edges 68 of the arm 16 when the cap is closed.

The resilient means 54 is of sufficient strength to constantly urge the cap 38 to the closed condition shown in the full lines in the drawing, the cap in its open position being shown in broken lines in FIG. 3 of the drawing. Thus, it will be appreciated that the cap constantly encloses the end portion 26 of drawbar 18 and thereby prevents access to the locking ring 34, or the pin 32, all to the end that dislodgment of the ring and, therefore, the pin, may be prevented. Even if the pin 32 is not provided with a locking ring such as 34, it will be appreciated that the enclosure of the pin by the cap would normally prevent access thereto and thus prevent the pin from falling from within hole 30. It will also be appreciated that inasmuch as the protective cap assembly is mounted upon the arm 16, and as the cap is in the nature of a cup-shaped element, the cap will at all times cover the end 26 and, therefore, the pin 32, regardless of the shifting movement of the arm 16, the drawbar 18, or other associated components.

As a result of the provision of the protective cap hereinabove described, dislodgment of the pin 32 and therefore, withdrawal of the drawbar 18 from its connection with arms 14 and 16, is prevented thereby resulting in the saving of considerable time and expense to persons utilizing tractors having a 3-point hitch for connection with trailed implements or the like.

Having thus described the invention, what is claimed as new and desired to be secured by Letters Patent is:

1. For use with a power lift assembly of a tractor having a drawbar interconnecting a pair of spaced arms and a removable retaining pin traversing the drawbar adjacent one of its ends for holding the proximal arm in place on the drawbar, structure for protecting said pin comprising:
   a hollow cap having an open end adapted to receive said end of the drawbar housing the retaining pin within the cap;
   mechanism for mounting said cap on said proximal arm for swinging movement to and from a position receiving said end of the drawbar and housing the retaining pin; and
   resilient means carried by said mechanism and engageable with the arm and the cap for yieldably holding the latter biased in said position.

2. The invention of claim 1, said mechanism including a hinge having a bracket provided with a hinge pin adapted for attachment to said proximal arm, and strap means rigid to the cap and journaled on the hinge pin.

3. The invention of claim 2, said resilient means comprising a spring having a bight adapted to engage said proximal arm, a pair of legs extending from the bight and coiled about the hinge pin, and a pair of fingers extending from the hinge pin into engagement with the cap.

4. The invention of claim 3, said cap having an arcuate flange adjacent the open end thereof adapted to partially surround one end of said proximal arm when the cap is in said position, said cap having an arcuate edge held against one face of said proximal arm by the spring when the cap is in said position.

References Cited by the Examiner
UNITED STATES PATENTS

| | | | |
|---|---|---|---|
| 2,342,907 | 2/1944 | Stall | 280—507 X |
| 2,446,347 | 8/1948 | Walkowiak | 280—507 |
| 2,616,717 | 11/1952 | Dunlap | 280—507 |
| 2,912,257 | 11/1959 | Du Shane | 280—460 |

LEO FRIAGLIA, *Primary Examiner.*